United States Patent
Tseng et al.

(10) Patent No.: US 9,016,121 B2
(45) Date of Patent: Apr. 28, 2015

(54) APPARATUS OF DIGITAL ENVIRONMENT MONITOR HAVING HIGH-PRESSURE CHAMBER EASY IN MAINTENANCE

(71) Applicant: Institute of Nuclear Energy Research, Atomic Energy Council, Executive Yuan, R.O.C., Taoyuan County (TW)

(72) Inventors: Hsun-Hua Tseng, Taoyuan County (TW); Jinn-Yih Wu, Taoyuan County (TW); Tin-Yu Liaw, Hsinchu County (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 45 days.

(21) Appl. No.: 14/058,367

(22) Filed: Oct. 21, 2013

(65) Prior Publication Data
US 2014/0109671 A1  Apr. 24, 2014

(30) Foreign Application Priority Data
Oct. 24, 2012  (TW) .............................. 101139377 A

(51) Int. Cl.
G01L 19/04    (2006.01)
G01P 1/02     (2006.01)
G01D 11/24    (2006.01)
G21C 17/00    (2006.01)

(52) U.S. Cl.
CPC .............. *G01D 11/245* (2013.01); *G01D 11/24* (2013.01); *G21C 17/00* (2013.01)

(58) Field of Classification Search
CPC ...................................................... G01D 11/24
USPC ........................................................... 73/431
See application file for complete search history.

(56) References Cited

U.S. PATENT DOCUMENTS 5,801,632 A *   9/1998  Opal ............................. 340/585
2004/0190229 A1 *  9/2004  Caci et al. ..................... 361/600

\* cited by examiner

*Primary Examiner* — Lisa Caputo
*Assistant Examiner* — Jamel Williams
(74) *Attorney, Agent, or Firm* — Jackson IPG PLLC; Demian K. Jackson

(57) ABSTRACT

A digital apparatus is provided for monitoring environment. The apparatus has a high-pressure chamber easy in maintenance. By using a supporting unit, the chamber is stably set in a container. In addition, the supporting unit reduces problem of saturated-humidity absorption so that wastage of utilities and rate of fake signals are both decreased. Thus, the chamber is prevented from mist and vapor for keeping good function.

6 Claims, 3 Drawing Sheets

APPARATUS OF DIGITAL ENVIRONMENT MONITOR HAVING HIGH-PRESSURE CHAMBER EASY IN MAINTENANCE

TECHNICAL FIELD OF THE INVENTION

The present invention relates to digital environment monitor; more particularly, relates to stably setting a high-pressure chamber in a container by a supporting unit for reducing hardware wastage and false signal rate caused by saturated humidity, where the high-pressure chamber is prevented from dampness, thus, conquers environmental problems of temperature and humidity and effectively reduces failure rate.

DESCRIPTION OF THE RELATED ART

High-pressure chamber device is highly sensitive, reliable, energy-responsive, dose-responsive and environment-tolerant to be used in nuclear plants, nuclear emergency warning systems and civil defense departments. The chamber device coordinated with proper electronic design can obtain a measurement range of span over nine orders of magnitude about 0.1 µR/h~100 R/h (i.e. 1 nGy/h~1 Gy/h). Thus, even a little amount of radioactive contents can be shown to obtain a correct dose measurement for correct decision on protecting people's lives and property safety.

A general high-pressure chamber device for environmental radiation monitor comprises a main body; a chamber set in the body; a plurality of emulsion bolsters separately set at top and bottom of the chamber; a monitor connected with the chamber; and a cover closing the main body. The chamber device can be used as a standard device for continuously monitoring environmental gamma radiation dose.

However, owing to high temperature, high humidity and acid rain in different environments and climates, the chamber device has high damage rate and is hard to maintain. The bolsters at the top and bottom of the chamber are critical. In north America and Europe, porous foam rubbers are used to make the bolsters for resisting the dry and cold weather and the big temperature difference between day and night. But, in subtropical areas, it is muggy before noon and have thundershower in the afternoon. Consequently, the chamber device may be easily damaged. In a practical use for a rather long time, the bolsters may become permeable to water and the high-pressure chamber device becomes wet, which is caused by electrode leakage. The permeable bolsters may also cause high error rate to the chamber device. Besides, the chamber device is usually a dangerous product, which may lay heavy burden on users for maintenance or abandonment. In addition, a new chamber device may cost very high (~US $20,000/pcs) and becomes uneasy in widely applying to corners of a country for radiation safety.

Hence, the prior art does not fulfill all users' requests on actual use.

SUMMARY OF THE INVENTION

The main purpose of the present invention is to stably set a high-pressure chamber in a container by a supporting unit for reducing hardware wastage and false signal rate caused by saturated humidity, where the high-pressure chamber is prevented from dampness, thus, conquers environmental problems of temperature and humidity and effectively reduces failure rate.

To achieve the above purpose, the present invention is an apparatus of digital environment monitor having an easy-in-maintenance high-pressure chamber, comprising a container, a supporting unit, and a high-pressure chamber, where the container comprises a containing area and a cover; the cover closes the containing area; the supporting unit is set in the containing area; the high-pressure chamber is set in the supporting unit; the supporting unit comprises an upper supporter and a lower supporter; the upper supporter is set on an inner end of the containing area; the lower supporter is opposed and connected to the upper supporter; the high-pressure chamber is set between the upper supporter and the lower supporter; and the supporting unit and the high-pressure chamber are closed in the container with the cover; the lower supporter has a curved concave; the upper supporter has a hallowed area corresponding to the curved concave; and the high-pressure chamber is set between the curved concave and the hallowed area; and the upper supporter and the lower supporter are made of acrylics or a polymer material. Accordingly, a novel apparatus of digital environment monitor having an easy-in-maintenance high-pressure chamber is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the perspective view showing the preferred embodiment according to the present invention;

DESCRIPTION OF THE PREFERRED EMBODIMENT

The following description of the preferred embodiment is provided to understand the features and the structures of the present invention.

Figure 1:
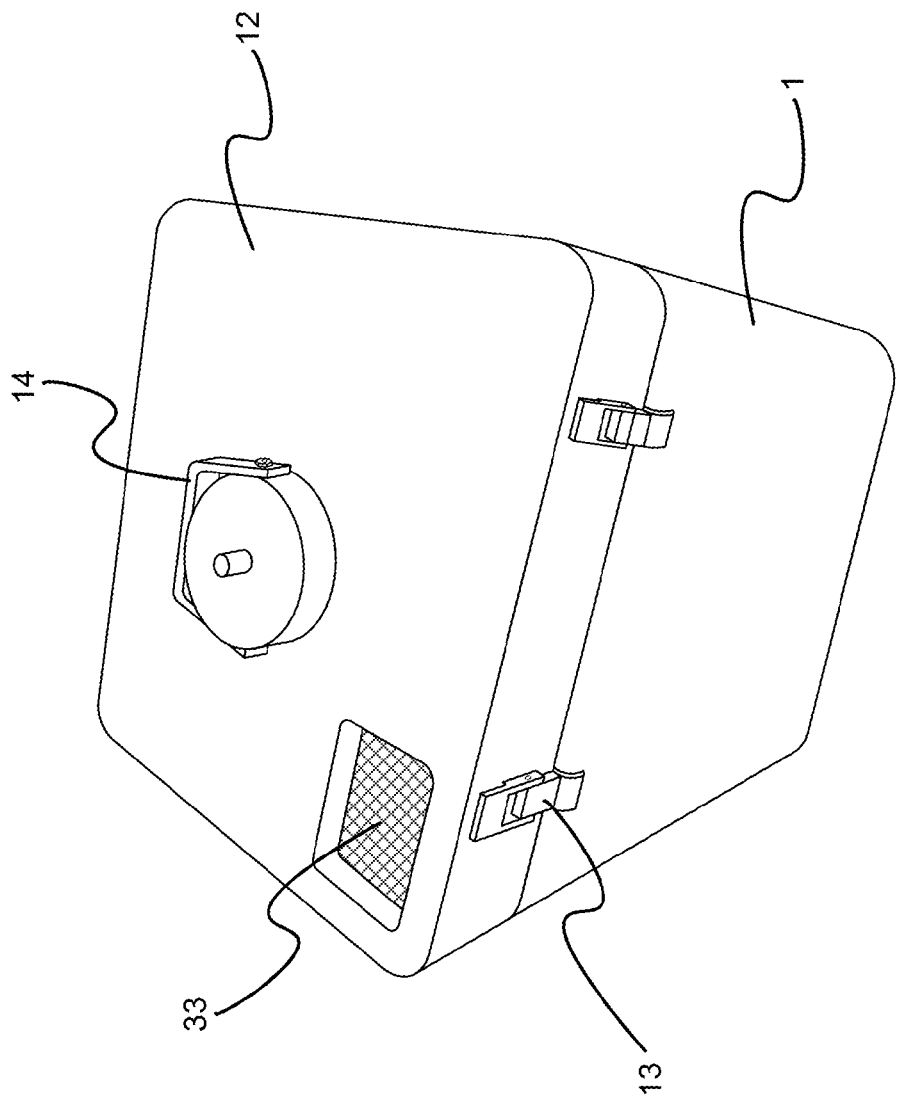
Figure 2:
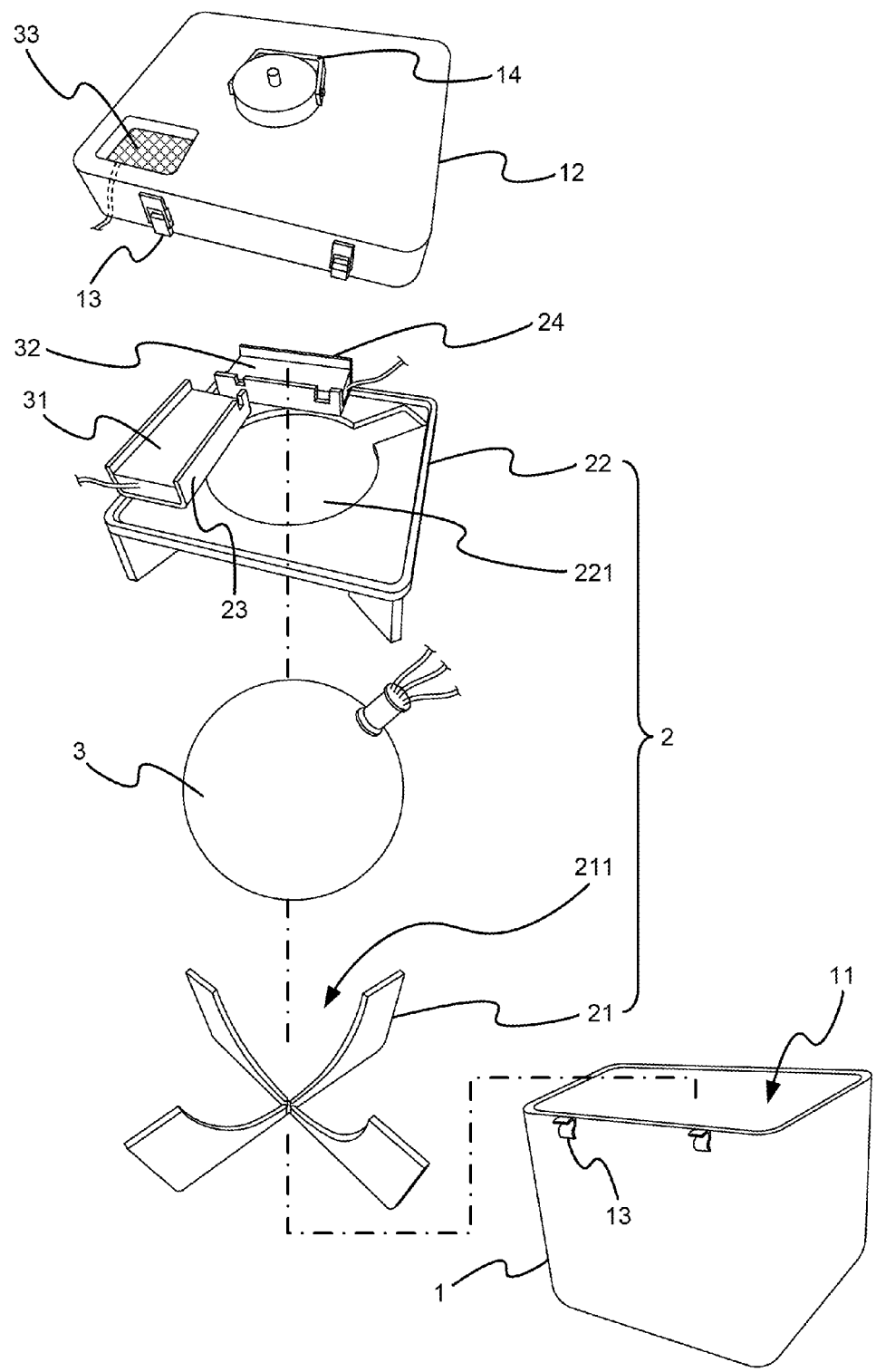
FIG. 2 is the explosive view showing the preferred embodiment.
Figure 3:
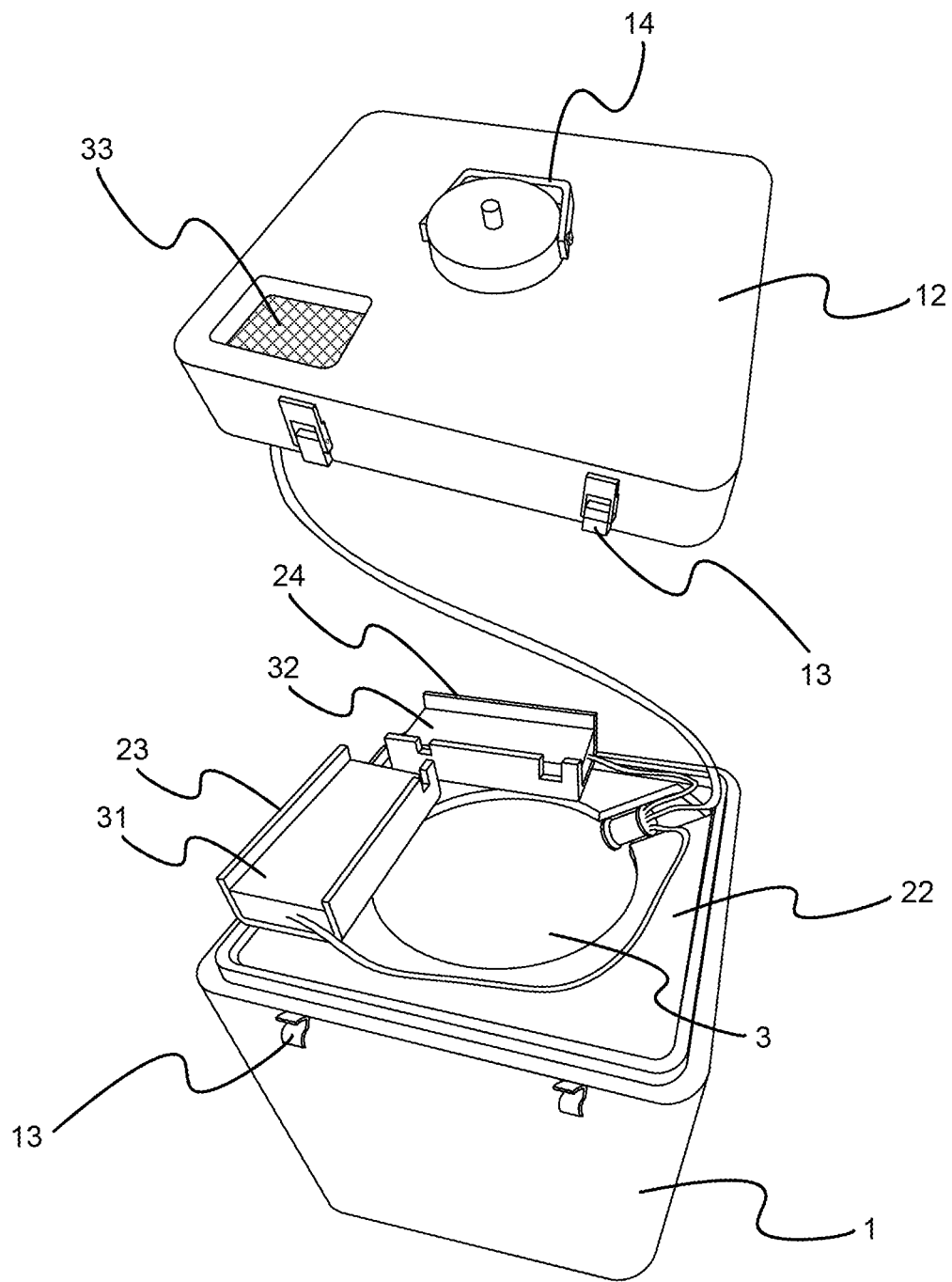
FIG. 3 is the view showing the state of opening the cover.

Please refer to FIG. 1 to FIG. 3, which are a perspective view and an explosive view showing a preferred embodiment according to the present invention; and a view showing a state of opening a cover. As shown in the figures, the present invention is an apparatus of digital environment monitor having a high-pressure chamber easy in maintenance, comprising a container 1, supporting unit 2 and high-pressure chamber 3.

The container 1 comprises a containing area 11; and a cover 12 closing the containing area 11. A buckle 13 is set between the container 1 and the cover 12; and, a handle 14 is set on an end surface of the cover 12.

The supporting unit 2 is set in the containing area 11. The supporting unit 2 comprises a lower supporter 21 set at bottom of the containing area 11; and an upper supporter 22 correspondingly connected with the lower supporter 21. Therein, the lower supporter 21 has a curved concave 211; the upper supporter 22 has a hallowed area 221 corresponding to the curved concave 211; at least two limit units 23,24 are set on top of the upper supporter 22; and, the upper and lower supporters 21,22 are made of acrylics or polymer materials.

The high-pressure chamber 3 is set between the curved concave 211 and the hallowed area 221 of the lower and upper supporters 21,22 of the supporting unit 2; and, the supporting unit 2 and the high-pressure chamber 3 is closed in the container 1 by the cover 12. The high-pressure chamber 3 is further connected with an embedded main controller 31, a digital low-current meter/high-pressure generator 32 and a detector 33. The embedded main controller 31 and the digital low-current meter/high-pressure generator 32 are separately set in the limit units 23,24. The detector 33 is set on an outside surface of the cover 11. Thus, a novel apparatus of digital environment monitor having a high-pressure chamber easy in maintenance is obtained.

On using the present invention, the high-pressure chamber 3 is coordinated with the supporting unit 2 to be set in the containing area 11 of the container 1. The high-pressure chamber 3 is set between the curved concave 211 and the hallowed area 221 of the lower and upper supporters 21,22 of the supporting unit 2. The cover is coordinated with the buckle 13 to close the supporting unit 2 and the high-pressure chamber 3 in the container 1. Thus, the whole apparatus can be carried with the handle 14 on the cover 12 to be set at a required position for radiation detection. Since the upper and lower supporters 21 of the supporting unit 2 are made of acrylics or a polymer material, the high-pressure chamber 3 is prevented from dampness. Hence, the high-pressure chamber 3 can conquer environmental problems of temperature and humidity and effectively reduce failure rate.

To sum up, the present invention is an apparatus of digital environment monitor having a high-pressure chamber easy in maintenance, where a high-pressure chamber is stably set in a container by a supporting unit; the supporting unit reduces hardware wastage and false signal rate caused by saturated humidity; the high-pressure chamber is prevented from dampness; and, the high-pressure chamber can conquer environmental problems of temperature and humidity and effectively reduce failure rate.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of digital environment monitor having a high-pressure chamber easy in maintenance, comprising
    a container, said container comprising a containing area and a cover, said cover closing said containing area;
    a supporting unit, said supporting unit being located in said containing area; and
    a high-pressure chamber, said high-pressure chamber being located in said supporting unit.

2. The apparatus according to claim 1,
    wherein a buckle is obtained between said container and said cover; and a handle is obtained on an end surface of said cover.

3. The apparatus according to claim 1,
    wherein said supporting unit comprises a first supporter and a second supporter; said first supporter is located at an inner end of said containing area; said second supporter is opposed and connected to said first supporter; said high-pressure chamber is located between said first supporter and said second supporter; and said supporting unit and said high-pressure chamber are closed in said container with said cover.

4. The apparatus according to claim 3,
    wherein said first supporter has a curved concave; said second supporter has a hallowed area corresponding to said curved concave; and said high-pressure chamber is located between said curved concave and said hallowed area.

5. The apparatus according to claim 4,
    wherein said second supporter has at least two limit units on a top surface of said second supporter; said high-pressure chamber is further connected with an embedded main controller, a digital low-current meter/high-pressure generator and a detector; said embedded main controller and said digital low-current meter/high-pressure generator are located in said limit units; and said detector is located on an outside surface of said cover.

6. The apparatus according to claim 3,
    wherein said first supporter and said second supporter of said supporting unit are made of a material selected from a group consisting of acrylics and a polymer material.

* * * * *